(12) United States Patent
Kehrmann et al.

(10) Patent No.: US 11,850,641 B2
(45) Date of Patent: Dec. 26, 2023

(54) PROCESS FOR THE PURIFICATION OF WASTE MATERIALS OR INDUSTRIAL BY-PRODUCTS COMPRISING CHLORINE

(71) Applicant: amaTEQ Holding GmbH, Münster (DE)

(72) Inventors: Alexander Kehrmann, Münster (DE); Jan Hohlmann, Oberhausen (DE); Carsten Nass, Kalkar (DE); Gerhard Auer, Krefeld (DE); Christian Adam, Berlin (DE); Christopher Hamann, Berlin (DE); Dirk Stolle, Berlin (DE)

(73) Assignee: amaTEQ Holding GmbH, Münster (DE)

( * ) Notice: Subject to any disclaimer, the term of this patent is extended or adjusted under 35 U.S.C. 154(b) by 902 days.

(21) Appl. No.: 16/641,966

(22) PCT Filed: Sep. 4, 2018

(86) PCT No.: PCT/EP2018/073761
§ 371 (c)(1),
(2) Date: Feb. 25, 2020

(87) PCT Pub. No.: WO2019/043261
PCT Pub. Date: Mar. 7, 2019

(65) Prior Publication Data
US 2020/0222954 A1    Jul. 16, 2020

(30) Foreign Application Priority Data

Sep. 4, 2017 (EP) .................................... 17189174

(51) Int. Cl.
*B09B 3/40* (2022.01)
*C01G 9/02* (2006.01)
*C01G 9/04* (2006.01)
*C01G 9/08* (2006.01)
*C04B 7/36* (2006.01)
*C05D 9/00* (2006.01)
*C21B 15/00* (2006.01)
*C21C 5/56* (2006.01)
*C22B 1/00* (2006.01)
*C22B 1/08* (2006.01)
*C22B 7/00* (2006.01)
*C22B 7/02* (2006.01)
*C22B 13/02* (2006.01)
*C22B 19/30* (2006.01)
*C25C 1/16* (2006.01)

(52) U.S. Cl.
CPC ................. *B09B 3/40* (2022.01); *C01G 9/02* (2013.01); *C01G 9/04* (2013.01); *C01G 9/08* (2013.01); *C04B 7/365* (2013.01); *C05D 9/00* (2013.01); *C21B 15/006* (2013.01); *C21C 5/565* (2013.01); *C22B 1/005* (2013.01); *C22B 1/08* (2013.01); *C22B 7/002* (2013.01); *C22B 7/02* (2013.01); *C22B 13/025* (2013.01); *C22B 19/30* (2013.01); *C25C 1/16* (2013.01); *C21B 2200/00* (2013.01)

(58) Field of Classification Search
CPC .... B09B 3/40; C01G 9/02; C01G 9/08; C04B 7/365; C05D 9/00; C21B 15/006; C21B 2200/00; C21C 5/565; C22B 1/005; C22B 1/08; C22B 7/002; C22B 7/02; C22B 13/025; C22B 19/30; C25C 1/16
USPC .......................................................... 588/18
See application file for complete search history.

(56) References Cited

U.S. PATENT DOCUMENTS 5,698,759 A    12/1997   Fray et al.
2002/0011133 A1   1/2002   Horne et al.

FOREIGN PATENT DOCUMENTS

| EP | 1064982 A1 | 1/2001 |
|---|---|---|
| JP | H06-174383 A | 6/1994 |
| JP | H08-182983 A | 7/1996 |
| JP | 2000-301103 A | 10/2000 |
| JP | 2003-211127 A | 7/2003 |
| JP | 2005-029836 A | 2/2005 |
| JP | 2008-261006 A | 10/2008 |
| JP | 2009-165919 A | 7/2009 |
| JP | 2014-172765 A | 9/2014 |

OTHER PUBLICATIONS

Japanese Office Action dated Jun. 20, 2022, for Japanese Patent Application No. 2020-514245.
International Search Report and Written Opinion for Application No. PCT/EP2018/073761 dated Oct. 30, 2018.
International Preliminary Report on Patentability for Application No. PCT/EP2018/073761 dated Nov. 21, 2019.
Forinton et al., Recycling kiln bypass dust into valuable materials, Cement Industry Technical Conference. Apr. 11, 2013:1-6.
Matsuura et al., Removal of Zn and Pb from Fe2O3—ZnFe2O4—ZnO—PbO Mixture by Selective Chlorination and Evaporation Reactions. ISIJ International. Jan. 1, 2006;46(8):1113-9.
Pickles et al., Thermodynamic Analysis of the Selective Chlorination of Electric Arc Furnace Dust. J Hazard Mater. Jul. 30, 2009;166(2-3):1030-42. doi: 10.1016/j.jhazmat.2008.11.110. Epub Dec. 6, 2008.
PCT/EP2018/073761, Oct. 30, 2018, International Search Report and Written Opinion.
PCT/EP2018/073761, Nov. 21, 2019, International Preliminary Report on Patentability.

*Primary Examiner* — Edward M Johnson
(74) *Attorney, Agent, or Firm* — Wolf, Greenfield & Sacks, P.C.

(57) ABSTRACT

The present application relates to a process for the purification of waste materials or industrial by-products, the process comprising the steps of: a) Preparing a composition (C) by blending or mixing waste materials or industrial by-products comprising chlorine (B) with one or more materials comprising heavy metals (HM) b) Reacting (B) and (HM) by thermal treatment of (C) c) Separating evaporated heavy metal chloride compounds (HMCC) d) Obtaining a solid material after the thermal treatment step.

18 Claims, 6 Drawing Sheets

PROCESS FOR THE PURIFICATION OF WASTE MATERIALS OR INDUSTRIAL BY-PRODUCTS COMPRISING CHLORINE

RELATED APPLICATIONS

This application is a national stage filing under 35 U.S.C. § 371 of International Patent Application No. PCT/EP2018/073761, filed Sep. 4, 2018, which claims the benefit of European Patent Application No. 17189174.0, filed Sep. 4, 2017, each of which is incorporated herein by reference in its entirety.

TECHNICAL FIELD

The present invention relates to a process for the purification of waste materials or industrial by-products comprising chlorine by thermal treatment and recycling of said purified materials into an industrial process. The waste materials or industrial by-products comprising chlorine can be, for example, bypass dusts from cement production.

BACKGROUND

In cement manufacturing huge amounts of dust are generated that need to be recycled into the process again. However, the recycling of the dusts into the production process can lead to undesirable side effects, for example to the accumulation of chlorides in the industrial plant and, consequently, to corrosion in the cement plant and an increase in the chloride content in the cement.

Bypass systems have been used in cement manufacturing facilities to remove chlorine that may cause several troubles, e.g. detrimental effect on the quality of cement, formation of deposits in the kiln, or preheater clogging. A bypass causes a partial removal of the furnace gas with the dust contained therein and the completely or partially condensed components to be removed before entering the preheater.

Rising prices for fossil fuels, such as petroleum, lignite and brown coal, as well as natural gas, represent an increasingly important cost factor in the operation of industrial plants, such as cement production plants. This development leads to an increased use of substitute fuels (such as, e.g. plastics wastes, sorted waste fractions, animal flour, tires, solvents, etc.) which, while reducing fuel costs, results in an increased input of unwanted substances such as chlorides. In the process of cement production, however, there is an upper limit of 0.1% for chlorides in the final cement. Therefore, a high chloride content is disadvantageous for cement production.

Due to the increased use of substitute fuels the quantity of chlorine, and the quantity of chlorine-containing bypass dust that is generated, have increased. The proportion of the bypass gas in the entire furnace gas stream of a cement kiln is generally 3-15%.

The volatile constituents (at 1450° C.) of the bypass dusts are $Na_2O$, $K_2O$, sulfur oxides, chlorine or chlorides, carbonates and bicarbonates of the alkali and alkaline earth metals, as well as ammonium chloride. Also some heavy metals like Zn or Pb usually are present in the bypass dust.

WO 2012/142638 A1 describes a leaching process for the treatment and utilization of bypass dusts from the cement production process. The brine obtained from wet treatment of the bypass dust is treated appropriately in order to separate off the heavy metals present with subsequent fractional crystallization.

However, this process is expensive and involves an additional challenging process step in the form of the wet treatment.

There are some other uses for bypass dust, e.g. manufacturing of certain low-quality cement or cementitious material, but it is always challenging to find an outlet for the complete material. Therefore, the bypass dust sometimes has to be landfilled.

TECHNICAL PROBLEM

Figure 1A:
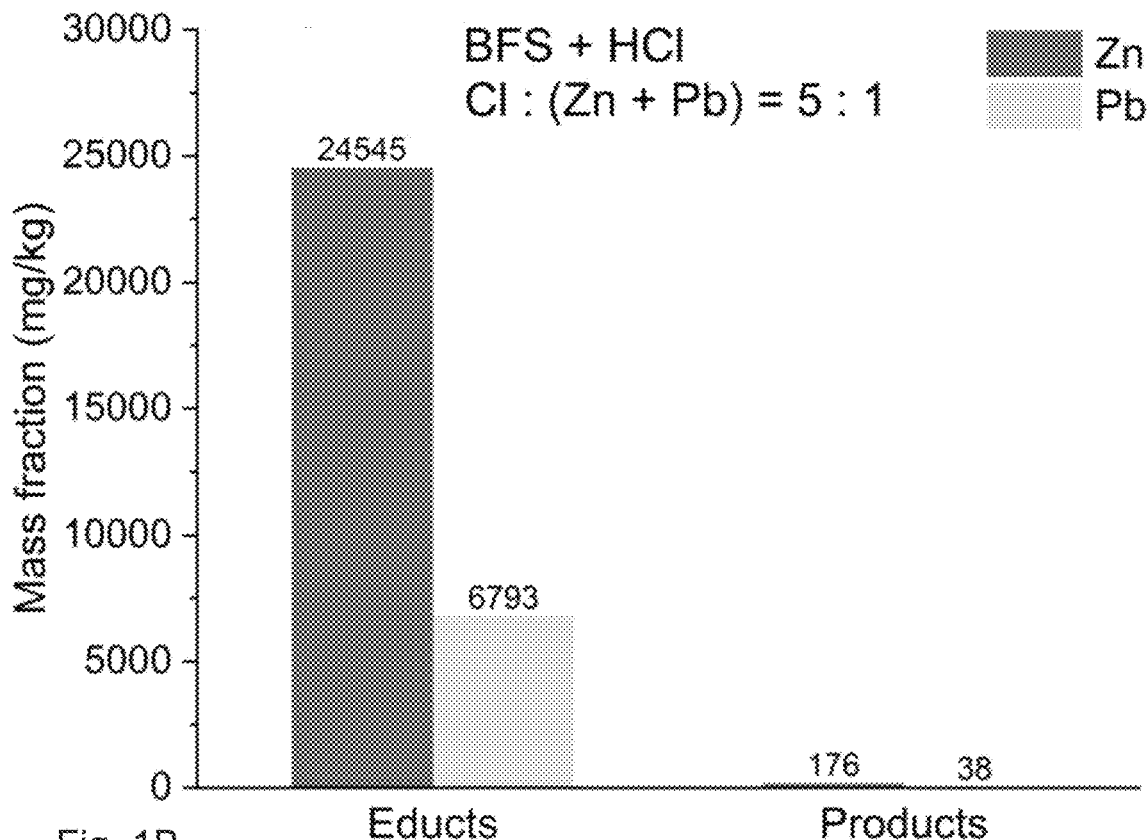
FIGS. 1A-1F show the Zn and Pb concentrations of various materials thermally treated at 1000° C. for 180 min under non-oxidizing conditions (products) compared against Zn and Pb concentrations of the starting materials (educts); cf. Table 1 for experimental conditions.
Figure 1B:
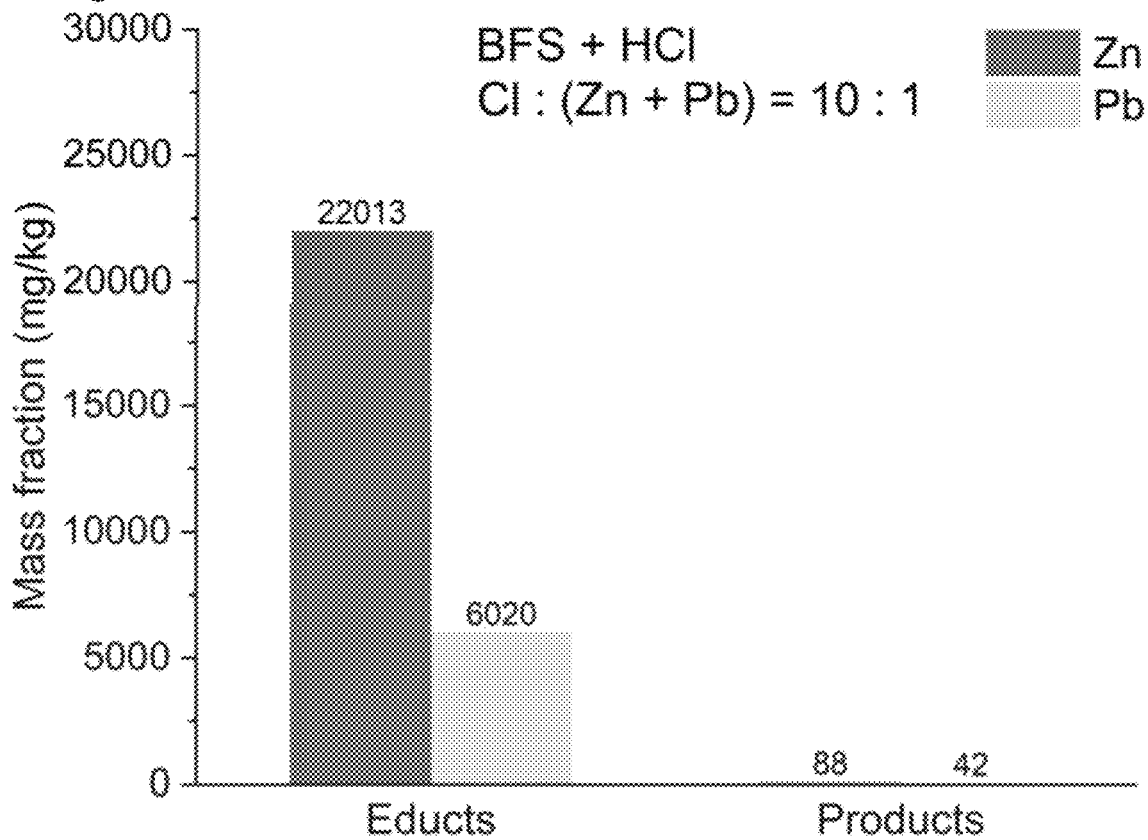
Figure 1C:
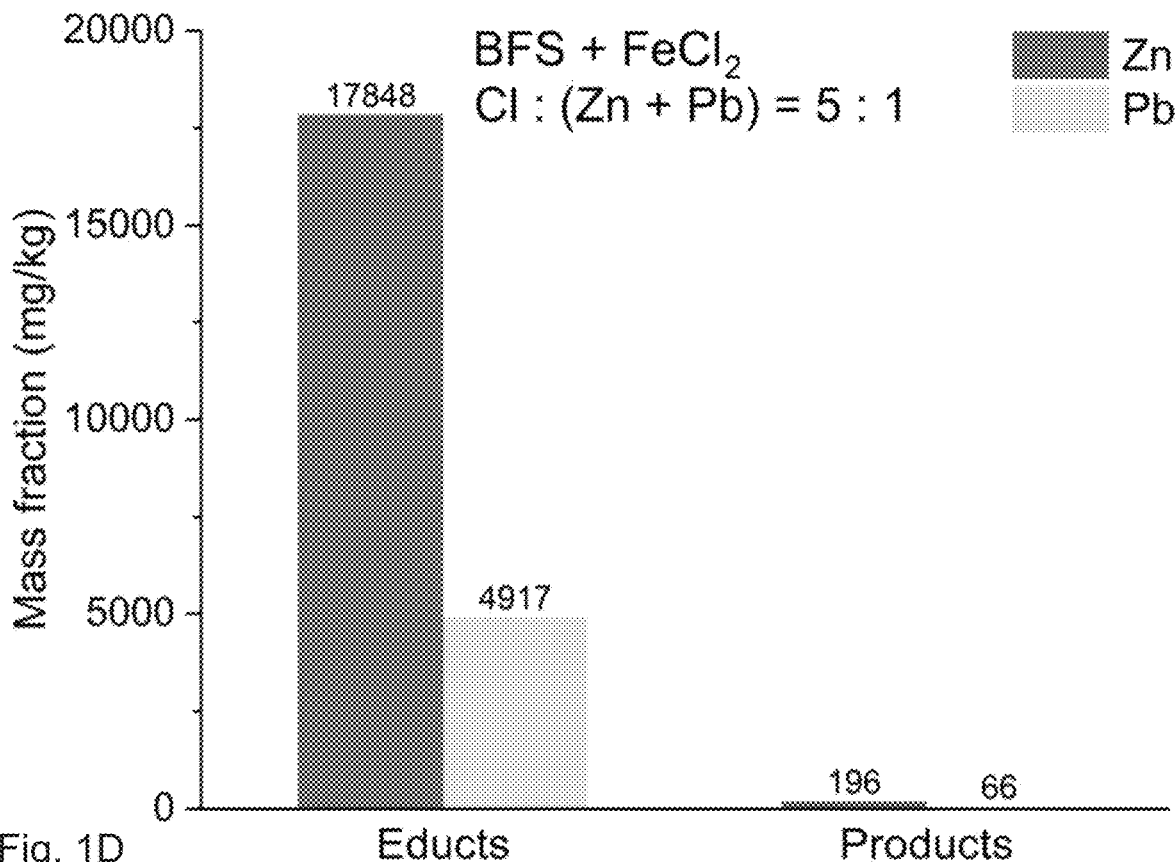
Figure 1D:
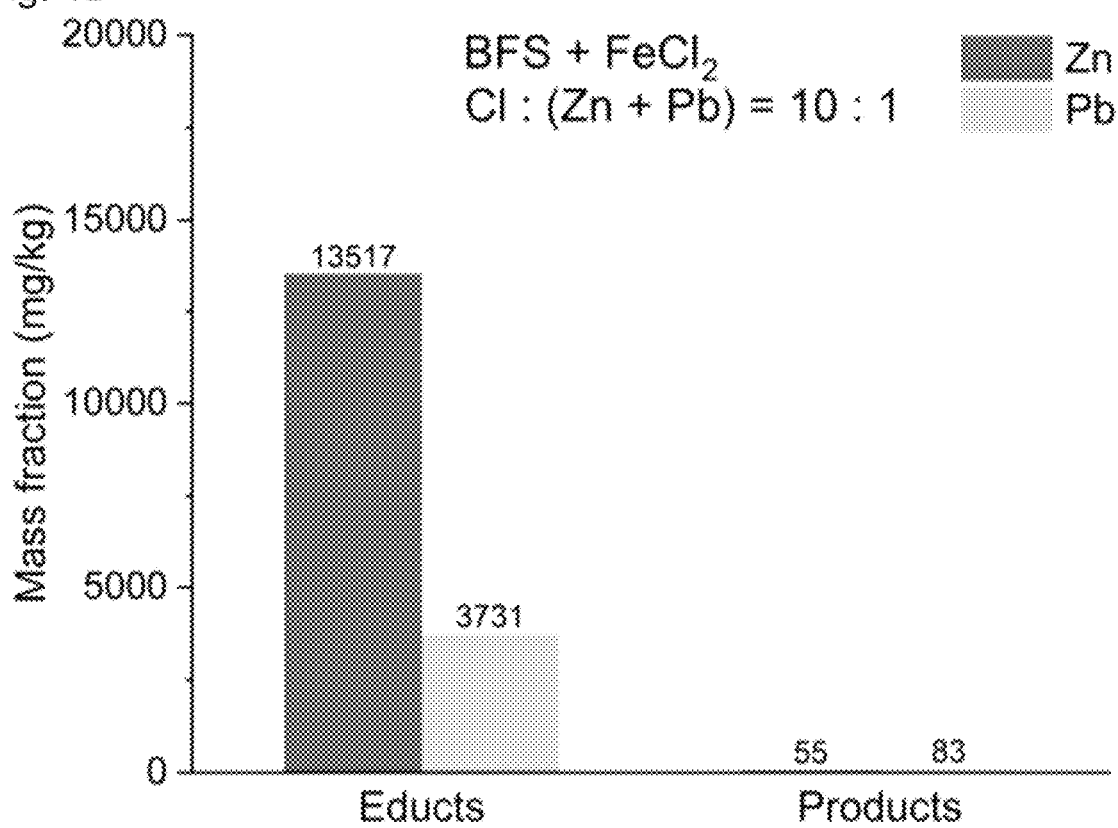
Figure 1E:
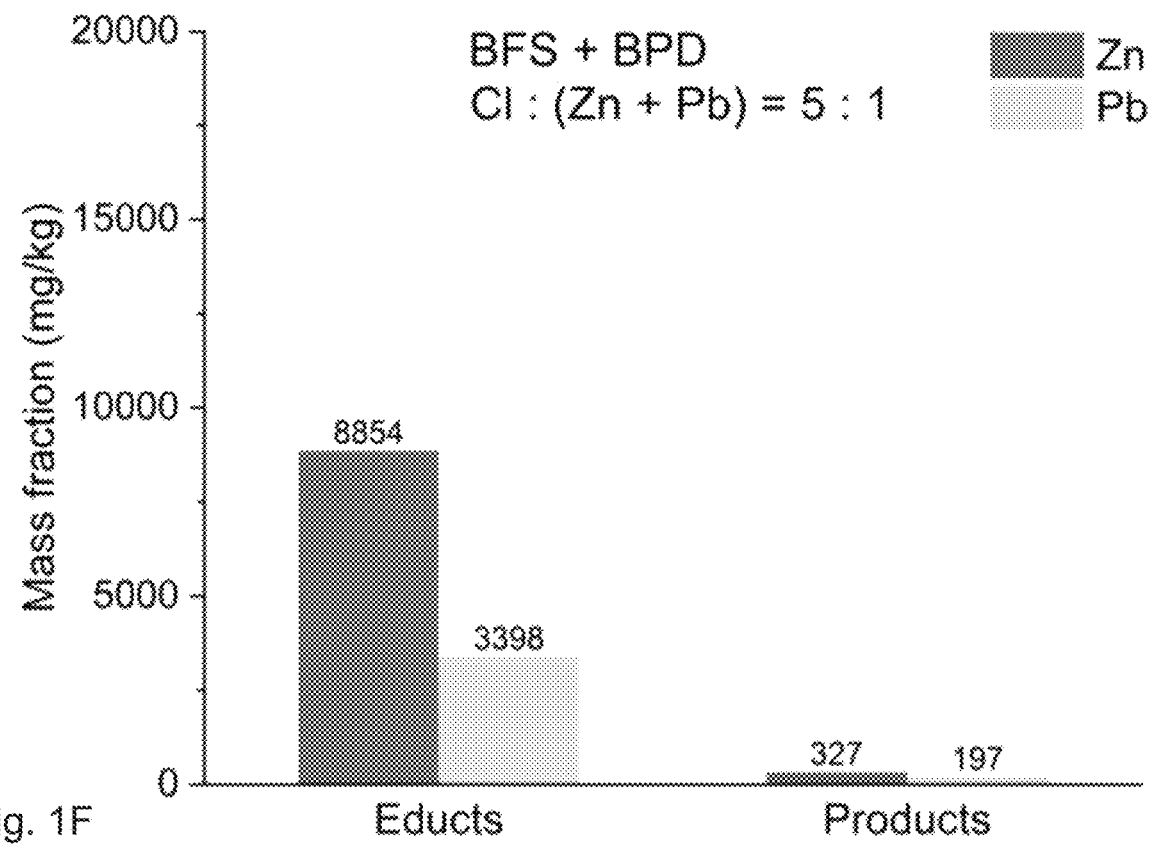
Figure 1F:
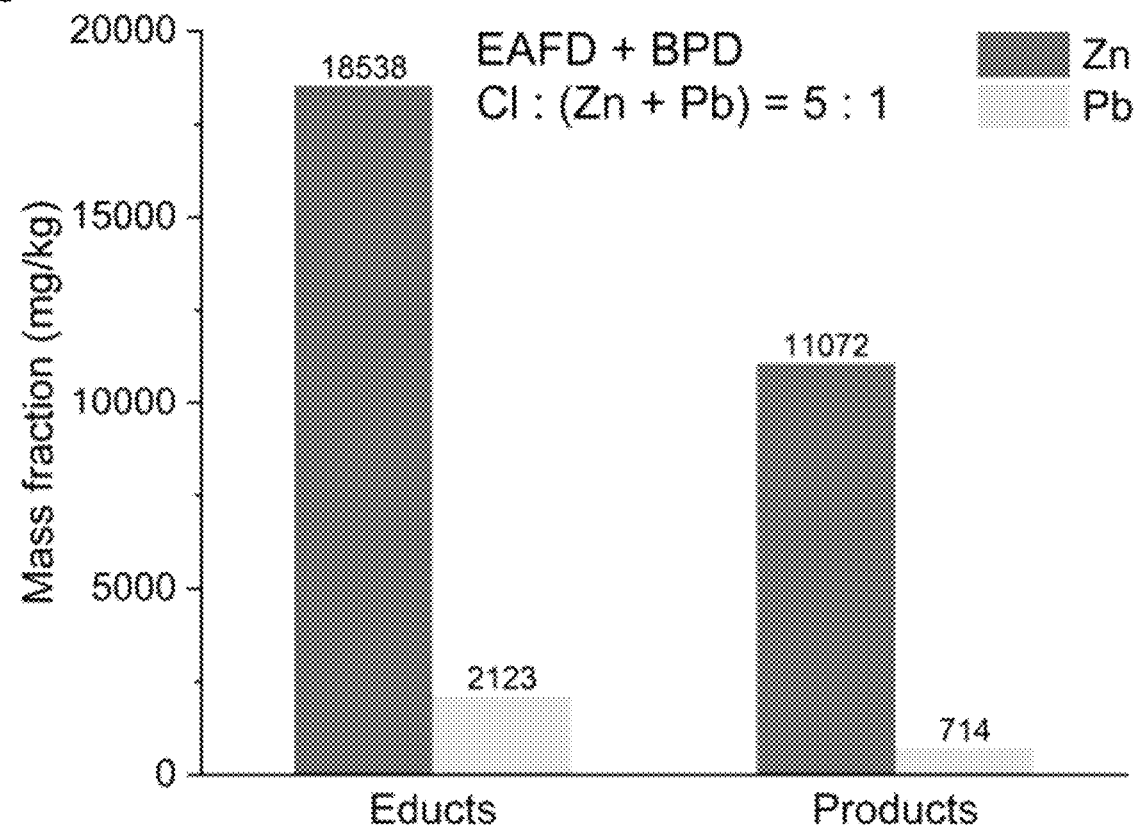

From this background, the present invention is concerned with a process for the purification of waste materials or industrial by-products comprising chlorine, specifically bypass dust from cement manufacture, by means of an efficient removal of chlorides.

Generally, any treatment of chlorine-comprising waste materials or industrial by-products creates costs (energy, equipment, personnel etc.). Additional costs may arise for materials necessary for the treatment and for the disposal of waste generated by this treatment. On the other hand, there can be some commercial value for products generated by the treatment.

In consideration of the prior art on the treatment of bypass dust the problem was to find a technically viable and cost-efficient process for removing part of or all chlorine from chlorine containing waste materials or industrial by-products, e.g. bypass dust from cement manufacturing, without the disadvantages of the known processes in the state of the art, i.e. wet treatment, costs for the disposal of materials generated by such a treatment, detrimental effects on the quality of cement and troubles in the cement kiln. Especially in view of the huge volumes of chlorine-comprising waste materials or industrial by-products (with bypass dust from cement production being several 100,000 tons per year alone in Germany) the availability, technical suitability and logistic criteria of appropriate material are highly important.

Solution to the Problem

The problem was solved by an inventive process for the purification of waste materials or industrial by-products comprising chlorine (B) and heavy metals (HM), the process comprising the steps of:

a) Preparing a composition (C) by blending or mixing waste materials or industrial by-products comprising chlorine (B) with one or more materials comprising heavy metals (HM)
b) Reacting (B) and (HM) by thermal treatment of (C)
c) Separating evaporated heavy metal chloride compounds (HMCC)
d) Obtaining a solid material after the thermal treatment step Preferably the solid material obtained after the thermal treatment step is recycled into an industrial process, preferably into a cement manufacturing process. This may include recycling into the cement kiln or using the solid material for manufacturing of specific types of cement or cementitious materials.

This inventive solution for a thermal treatment of waste materials or industrial by-products comprising chlorine is enabled by identifying materials comprising heavy metals as appropriate reagents, e.g. dusts from steel manufacturing, that meet the technical requirements and are available in the required quantities. Especially in view of the huge volumes of chlorine-comprising waste materials or industrial by-products (with bypass dust from cement production alone being several 100,000 tons per year) the availability, technical suitability and logistic criteria of an appropriate material are highly important.

The inventive solution avoids the disadvantages of the known processes in the state of the art, i.e. wet treatment, cost for the disposal of materials generated by such a treatment, disposal of bypass dust, low-quality cementitious materials made with bypass dust, detrimental effects on the quality of cement and troubles in a cement kiln.

Heavy metals in this document are metals with a specific weight of >5 g/cm$^3$, e.g. Zn, Pb, Cd, Cu, TI or Hg.

Unless otherwise stated all %-data is weight-%, and all ppm-data are on a weight by weight base.

Waste materials or industrial by-products comprising chlorine (B) may be any materials with a significant amount of chlorine, preferably >0.5%. A specific embodiment of B is bypass dust from cement manufacture. Another embodiment of B is polyvinyl chloride (PVC) or waste comprising PVC. Another embodiment of B is waste hydrochloric acid, especially waste hydrochloric acid comprising Fe and/or other heavy metals. Other examples are waste iron chloride, preferably FeCl2, or materials comprising FeCl2 or FeCl3, e.g. waste metal chlorides from leaching of ilmenite or waste metal chlorides from chlorination of ilmenite or titanium slag. These materials are of specific interest for thermal reaction with electrosteel dust due to a significant content of chromium in both reaction partners.

Chlorine can be present in organic or inorganic form or in a combination of both. Inorganic chlorine is identical to chloride in the context of this document.

Materials comprising heavy metals (HM) may be any material different from B and comprising at least some heavy metals that can be volatilized at higher temperatures after conversion into chloride. Examples of (HM) are steelworks dust ("Gichtgasstaub") or sludges or filter cakes that are obtained from gas scrubbing of steelworks dust or other dusts comprising heavy metals. Other examples of (HM) are electrosteel dust, sludges from pigment manufacturing, converter sludge, mill scale or mill scale sludge or any mixtures comprising one or more of these materials. Other examples are active carbon loaded with heavy metals or sludges obtained from neutralization of heavy metal compounds.

One embodiment of the invention is a first conventional thermal treatment volatilizing Zn and/or Pb as elements or oxides with a subsequent thermal treatment in presence of chlorine. This two-step approach allows regaining some Zn and/or Pb in the form of elements or oxides and utilizing established techniques for purification or recycling (Waelz process).

Preferably, the materials comprising heavy metals (HM) are in the form of a sludge or a filter cake. If (HM) is a dust or a dry material it can be advantageous to add some water or moist material prior to the mixing step. This can help the chloride ions to move away from low volatile compounds (e.g. KCl or $CaCl_2$), so as to generate more volatile compounds (e.g. $ZnCl_2$ or $PbCl_2$). Experimental data exhibit a significant advantage (i.e. more volatilized heavy metals in thermal treatment) when mixing (B) and (HM) in the presence of some water (with subsequent drying prior to the thermal treatment).

Preferred are fine materials for (B) and (HM) due to their higher reactivity. One embodiment of the invention includes a granulation step prior to thermal treatment.

Reaction of (B) and (HM) by thermal treatment of (C) preferably is carried out in a reducing or inert atmosphere, especially in the case of carbon being present in composition (C).

FURTHER PREFERRED EMBODIMENTS

A specific and preferred embodiment of the invention is the thermal treatment of a mixture of by-pass dust from cement industry (B) and a sludge or a filtercake obtained from dust from steel manufacturing (HM) ("Gichtgasschlamm"). A typical chlorine content of (B) is 3-15% and a typical content of Zn in (HM) is 1-5% and Pb=0.1-2%.

Thus, for example, a 43:57 mixture of by-pass dust with 6.4% of Cl and dust from steel industry with 2.3% of Zn and 0.5% of Pb is sufficient for volatilizing a significant part of the chloride and heavy metals present in composition (C).

Zn and Pb are efficiently volatilized as chlorides at temperatures of 800-900° C. The solid material obtained after thermal treatment comprises about 10% of Fe and 25% of carbon. Recycling the solid material obtained after the thermal treatment step into the cement kiln delivers the additional advantages of supplying Fe as valuable raw material for cement and using the carbon as fuel in the cement kiln.

Another specific and preferred embodiment of the invention is the thermal treatment of a mixture of by-pass dust from cement industry (B) and dust from electrosteel manufacturing (HM).

Dust from electrosteel manufacturing typically contains significant amounts of heavy metals, e.g. up to 30% of Zn and 2% of Pb. Thus, quite a small fraction of electrosteel dust (5-30%) can be sufficient for volatilizing a significant part of the chloride in the by-pass dust.

There can be taken more chlorine in the blend than stoichiometrically necessary for volatilizing the heavy metals, e.g. a stoichiometric excess of 10-20% of chlorine. This results in better removal of heavy metals, but more chlorine in the solid residue. If the solid residue is recycled into the cement process again, this imposes no major problem.

If the solid residue is to be recycled into the steel manufacturing process, the chlorine content should be as low as possible. Therefore, in this case there should be no stoichiometric excess of chlorine.

It is also possible to select another industrial use for the solid residue, e.g. as material for construction. Depending on the requirements for this application the focus may be on a very low content of chlorine or a very low content of HMCCs.

It is also possible to use more than one material comprising chlorine and/or more than one material comprising heavy metals. Depending on cost, availability or requirements for the volatilized heavy metal chlorides or the solid residue after thermal treatment, complex mixtures may have technical and/or economic advantages.

The parameters of the process may vary depending on the requirements concerning chlorine and heavy metal content of the solid material to be recycled into an industrial process.

SPECIFIC EMBODIMENTS OF THE INVENTION

Specific embodiments of the invention are:

[1] Process for purification of waste materials or industrial by-products comprising chlorine (B), the process comprising the steps of:
  e) Preparing a composition (C) by blending or mixing waste materials or industrial by-products comprising chlorine (B) with one or more materials comprising heavy metals (HM)
  f) Reacting (B) and (HM) by thermal treatment of (C)
  g) Separating evaporated heavy metal chloride compounds (HMCC)
  h) Obtaining a solid material after the thermal treatment step.

[2] Process according to [1] whereby the solid material obtained after the thermal treatment step is recycled into an industrial process, preferably into a cement manufacturing process or into a metallurgical process.

Another possibility is recycling the solid material obtained after the thermal treatment step into steel manufacturing, e.g. into a sintering process.

[3] Process according to [1] or [2], characterized by the waste materials or industrial by-products comprising chlorine (B) being a dust from cement manufacturing, preferably by-pass dust from cement manufacturing, comprising 1-30% by mass, preferably 2-20% by mass, more preferably 3-15% by mass, of chloride.

[4] Process according to any one of the preceding [1] to [3], characterized by the heavy metals (HM) being one or more from the following set of elements: Zn, Pb, Hg, Cu, Cd, Tl, In, Sn, Ni, Co.

[5] Process according to any one of the preceding [1] to [4], characterized by the content of the heavy metals (HM) in the composition (C) being between 0.5 and 15% by mass, preferably between 1 and 12% by mass, most preferably between 1.5 and 10% by mass.

[6] Process according to any one of the preceding [1] to [5], characterized by at least a part of the heavy metals (HM) being capable of forming chlorides that have a vapor pressure of >10 millibar (10000 Pa) at temperatures below 1200° C., preferably, below 1000° C., most preferably below 900° C.

[7] Process according to any one of the preceding [1] to [6], characterized by the materials comprising heavy metals (HM) comprising >0.1% by mass, preferably >0.5% by mass, more preferably >2% by mass, most preferably >20% by mass of Zn and/or Pb.

[8] Process according to any one of the preceding [1] to [7], characterized by the materials comprising heavy metals (HM) comprising >50 ppm Cu and/or Cd.

In principle the inventive process also works with lower contents of heavy metals, but this would require large amounts of material and make the process less attractive from a commercial point of view.

[9] Process according to any one of the preceding [1] to [8], characterized by the material comprising heavy metals (HM) being a waste product or an industrial by-product.

This would mean to react two sorts of waste making the inventive process highly attractive from a commercial point of view. The inventive process might get even more attractive, if not only obtaining a solid material for recycling into an industrial process, but also by recycling the evaporated and separated heavy metal chloride compounds (HMCC). This can be achieved by properly selecting the kind of materials entering the process and by an optimized (fractionated) separation process for the HMCCs.

[10] Process according to any one of the preceding [1] to [9], characterized by the material comprising heavy metals (HM) comprising or consisting of dust from steel production, preferably a sludge or a filter cake obtained by separating dust from steel production ("Gichtgassschlamm"), dust obtained from electrosteel manufacturing or used activated carbon.

[11] Process according to any one of the preceding [1] to [10], characterized by the material comprising heavy metals (HM) comprising Fe in oxidic, hydroxidic or metallic form.

The generation and evaporation of iron chlorides is prevented by conversion of Fe in oxidic or hydroxidic form.

[12] Process according to any one of the preceding [1] to [11], characterized by the materials comprising heavy metals (HM) comprising iron chloride, for example waste metal chlorides obtained from the manufacture of $TiO_2$ according to the chloride process, waste metal chlorides obtained from the manufacture of synthetic rutile from ilmenite waste iron chlorides obtained from steel pickling, or waste hydrochloric acid, preferably comprising metals like Fe, Zn and/or Pb.

Materials comprising iron chlorides preferably may need a treatment with alkaline material (comprising OH ions) in order to separate the chloride from Fe and to generate Fe compounds (Fe hydroxides that will convert into iron oxides at elevated temperatures) with low vapor pressure at the temperatures of the thermal treatment step.

[13] Process according to any one of the preceding [1] to [12], characterized by the materials comprising heavy metals (HM) comprising carbon in the form of coke, carbon black or coal. This can bring additional value to the solid material obtained after thermal treatment, e.g. when recycling into a cement kiln.

[14] Process according to any one of the preceding [1] to [13], characterized by at least part of the heavy metals (HM) being metals that are not capable of forming chlorides that can be evaporated at temperatures below 900° C., preferably, below 1000° C., e.g. iron.

[15] Process according to any one of the preceding [1] to [14], characterized by the temperature of the waste materials or industrial by-products comprising chlorine (B) being >100° C., preferably >150° C., most preferably >200° C., at the time of mixing with the materials comprising heavy metals (HM).

[16] Process according to any one of the preceding [1] to [15], characterized by the ratio of the materials comprising heavy metals (HM) and the waste materials or industrial by-products comprising chlorine (B) being chosen so that the chlorine content of the composition (C) is between 100 and 150%, preferably between 100 and 130%, most preferably between 100 and 110%, of the amount being necessary for a stoichiometric conversion of the heavy metals (HM) in the materials comprising heavy metals (HM) into chlorides.

[17] Process according to any one of [1] to [15], characterized by the ratio of the materials comprising heavy metals (HM) and the waste materials or industrial by-products comprising chlorine (B) being chosen so that the chlorine content of the composition (C) is between 80 and 100%, preferably between 90 and 99%, most preferably between 90 and 95%, of the amount being necessary for a stoichiometric conversion of the zinc in the materials comprising heavy metals (HM) into chlorides.

[18] Process according to any one of the preceding [1] to [17], characterized by the materials comprising heavy metals (HM) and the waste materials or industrial by-products comprising chlorine (B) being mixed or blended in the presence of water, with 2-50% by mass, preferably 5-30% by mass, more preferably 10-20% by mass, of water being present in the total composition (C).

The water may be added when mixing composition (C) or whenever appropriate.

[19] Process according to any one of the preceding [1] to [18], characterized by the materials comprising heavy metals (HM) and the waste materials or industrial by-products comprising chlorine (B) being mixed or blended in the presence of water comprising $Ca^{2+}$ ions, preferably a $Ca(OH)_2$ solution, with the amount of water comprising $Ca^{2+}$ ions being such that a total ratio of Ca/S in the composition (C) is >1.2, preferably >2.0, more preferably >5.

A preferred possibility is that of the composition (C) being dried prior to the thermal treatment of step b).

[20] Process according to any one of the preceding [1] to [19], characterized by the thermal treatment being carried out at a temperature of 200-1500° C., preferably 300-1500° C., more preferably 300-1200° C., most preferably 500-900° C.

An even more preferred temperature for the thermal treatment is 500-850° C., preferably 600-700° C.

[21] Process according to any one of the preceding [1] to [20], characterized by the amount of volatilized materials (excluding water) being >1% by mass, preferably >2% by mass, most preferably >5% by mass, based on the total material entering the thermal treatment.

Assessment of amount of volatilized materials can be done by determination of the weight of the materials collected from the evaporated phase. Another option is determination of the difference of dry weight prior to the thermal treatment and dry weight after thermal treatment. Drying for determination of dry weight is done at 105° C. for 1 h.

[22] Process according to any one of the preceding [1] to [21], characterized by the mass ratio of the materials comprising heavy metals (HM) and the waste materials or industrial by-products comprising chlorine (B) being chosen in such way that the molar ratio of Fe/Ca in the composition (C) is 0.8-3, preferably 0.9-1.8, most preferably 1.0-1.3. This can enable calcium ferrite being generated during the thermal treatment process and open the door for recycling the solid material obtained after thermal treatment into the steel industry.

[23] Process according to any one of the preceding [1] to [22], characterized by the thermal treatment being carried out under a non-oxidizing atmosphere.

[24] Process according to any one of the preceding [1] to [23], wherein $ZnCl2$ is evaporated by performing the thermal treatment at temperatures of 500-700° C., preferably 600-680° C., under a non-oxidizing atmosphere.

[25] Process according to any one of [1] to [19], wherein the thermal treatment is performed at a temperature of 1000-1200° C. and under a non-oxidizing atmosphere.

[26] Process according to [1], wherein the waste materials or industrial by-products comprising chlorine (B) further comprise zinc, the process comprising the steps of
  a. Supplying a solution comprising chloride, preferably HCl or $FeCl2$
  b. Separating and collecting any fraction, preferably the fine fraction, of blast furnace dust by passing blast furnace dust through the solution comprising chloride
  c. Separating the solids from the liquid phase
  d. Drying the solid material and subjecting it to thermal treatment sufficient for evaporation of $ZnCl2$
  e. collecting the material obtained from thermal treatment

[27] Process according to any one of the preceding [1] to [26], characterized by separating zinc chloride from the gas phase at a temperature above the melting point of zinc chloride and obtaining zinc chloride as a liquid.

[28] Use of $ZnCl2$ obtained by the process according to any one of the preceding [1] to [27] for electrolytic conversion into metallic Zn, for manufacturing of ZnS pigments, for manufacturing of ZnO or for manufacturing micronutrient fertilizers.

The claimed invention also provides a composition (C) obtainable by blending or mixing of waste materials or industrial by-products comprising chlorine (B) with one or more materials comprising heavy metals (HM) whereby
  a) The Cl content is 0.5-15% by mass, preferably 1-5% by mass, most preferably 1.5-3.5% by mass
  b) The content of Zn is 0.2-12% by mass, preferably 0.5-7% by mass, most preferably 1-3% by mass
  c) The content of Pb is 0.05-3% by mass, preferably 0.1-2% by mass, most preferably 0.2-0.7% by mass
  d) The content of Ca (as CaO) is >10% by mass, preferably >15% by mass, most preferably >20% by mass In a preferred embodiment the content of Fe in composition (C) is >1.5% by mass, preferably >3.5% by mass, most preferably >6% by mass, as this will make the solid material obtained after thermal treatment more attractive.

The claimed invention further provides a solid material after thermal treatment of composition (C) obtainable by blending or mixing of waste materials or industrial by-products comprising chlorine (B) with one or more materials comprising heavy metals (HM) and subsequently carrying out thermal treatment wherein
  a) The Cl content is 0-4% by mass, preferably 0.1-2.5% by mass, most preferably 0.2-0.2-1% by mass
  b) The content of Zn is 0-1.2% by mass, preferably 0-1% by mass, most preferably 0-0.5% by mass
  c) The content of Pb is 0-0.6% by mass, preferably 0-0.4% by mass, most preferably 0-0.2% by mass
  d) The content of Ca (as CaO) is >10% by mass, preferably >15% by mass, most preferably >20% by mass The invention allows for, for example, increased use of inexpensive replacement fuels having an increased content of chlorine in cement manufacturing.

Advantages of the Invention

Significant reduction of chlorine in waste materials or industrial by-products, e.g. by-pass dust
reduction of chlorine allows more input of chlorine and less cost for secondary raw materials
Significant reduction of heavy metals in the solid material obtained after thermal evaporation of the heavy metal chloride compounds (HMCC)
Recycling of said solid material obtained after thermal treatment possible for industrial use materials comprising heavy metals (HM) can offer additional advantage: Utilizing of carbon as fuel and Fe as raw material (delivered by the steelworks dust) when recycling the solid material obtained after thermal treatment Recovery of heavy metals possible from heavy metal chloride compounds (HMCC)

Thermal separation of Zn and Pb with the option of obtaining Zn with little impurities of Pb For systems comprising Zn and/or Pb and chloride the characteristics of the inventive technology are:

Visible evaporation of $ZnCl_2$ (i.e. visible fume or smoke) starts at 300° C.

At ~650° C.: evaporation of essentially pure $ZnCl_2$ (>99% Zn; <1% Pb)

At ~800° C.: elimination of Zn (and Pb) to a low level

At ~1100° C.: nearly complete elimination of Zn and Pb

Product (mineral compound="MiC") obtained at ~1100° C. is essentially free of Zn and Pb No reducing agent necessary! (iron oxide remains iron oxide)

No significant evaporation of FeCl2 or FeCl3

Compared to the Waelz process ("Wälzprozess") the inventive process requires no reduction, lower temperatures, and delivers a solid product with significant lower Zn and Pb content. This opens the door for better usability.

Resulting from these features there arise different options for specific processes:

a) Elimination of most of Zn at temperatures around 800° C.:

The concentration of Zn in residual solid phase is reduced significantly (down to 0.1-10% of initial value); this opens the door for recycling back into the steel manufacturing processes or for uses with Zn being an unwanted element.

b) Elimination of nearly all Zn and/or Pb at temperatures around 1000-1100° C.:

Concentration of Zn and Pb in residual solid phase is reduced to very low levels (<<0.1% or even <200 ppm); this opens the door for recycling back into the steel manufacturing processes or for uses with Zn and/or Pb being a critical element.

Figure 4:
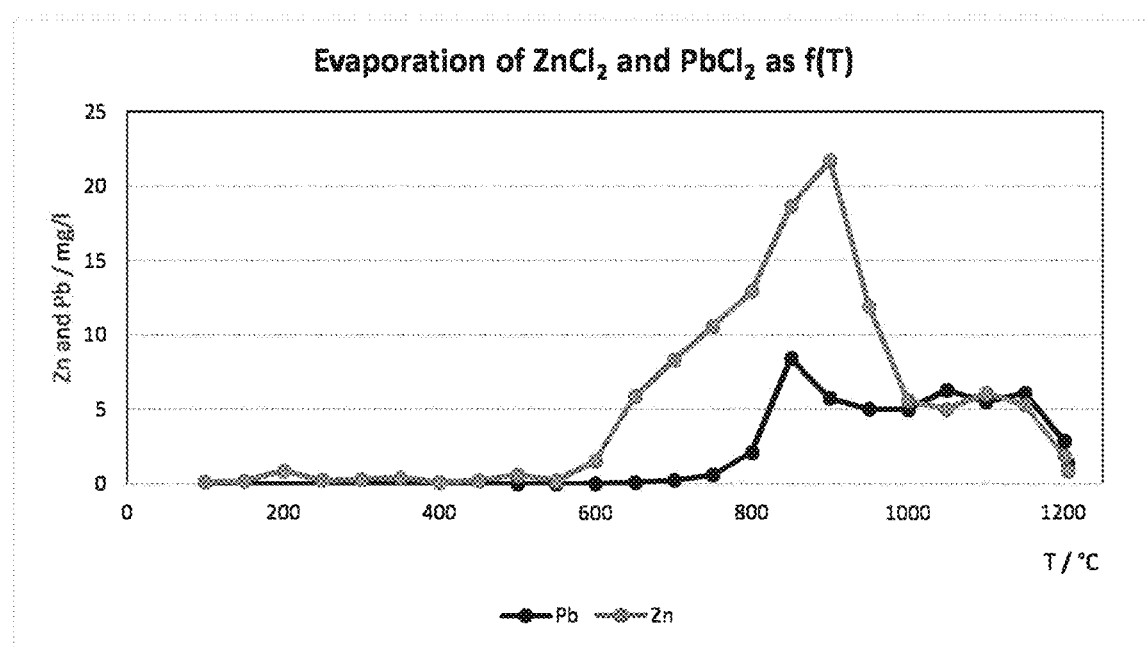
FIG. 4 shows the Zn and Pb concentrations in the nitric acid solution indicating the amount of Zn and Pb evaporated as function of temperature as observed for Example 4. The (relative) concentration of Zn and Pb indicates the (relative) intensity of evaporation of Zn and Pb.
Figure 5A:
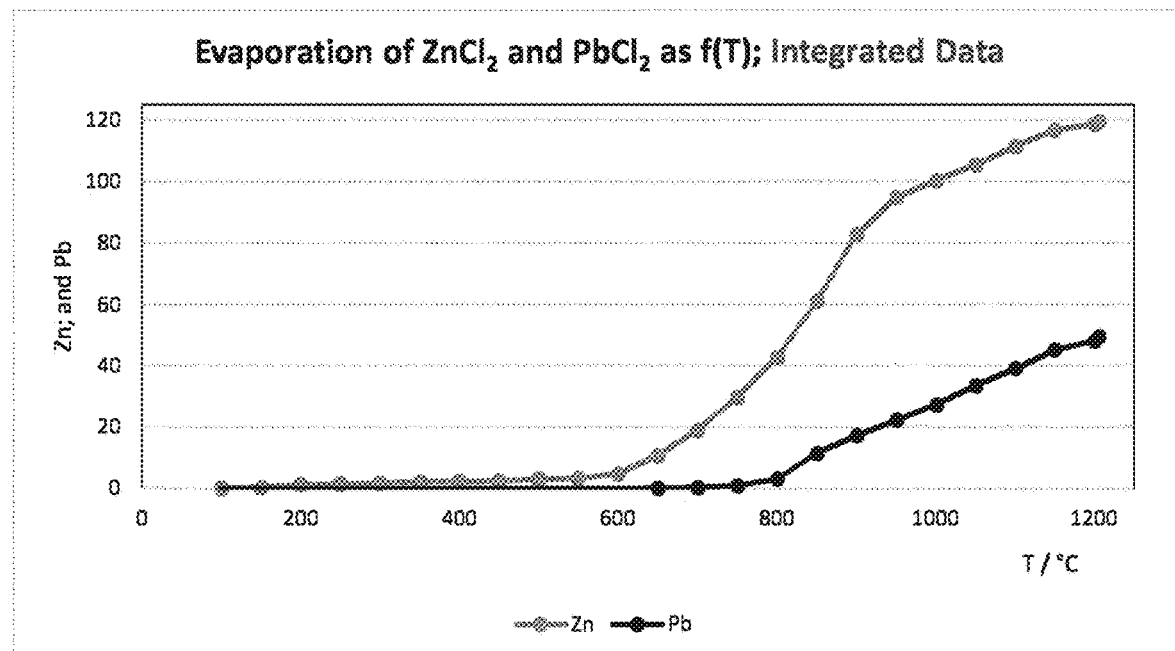
FIG. 5a: shows the integrated Zn and Pb concentrations in nitric acid solution collected during thermal treatment in Example 4. Integrated data means summing up all incremental fractions up to the indicated temperature.
Figure 5B:
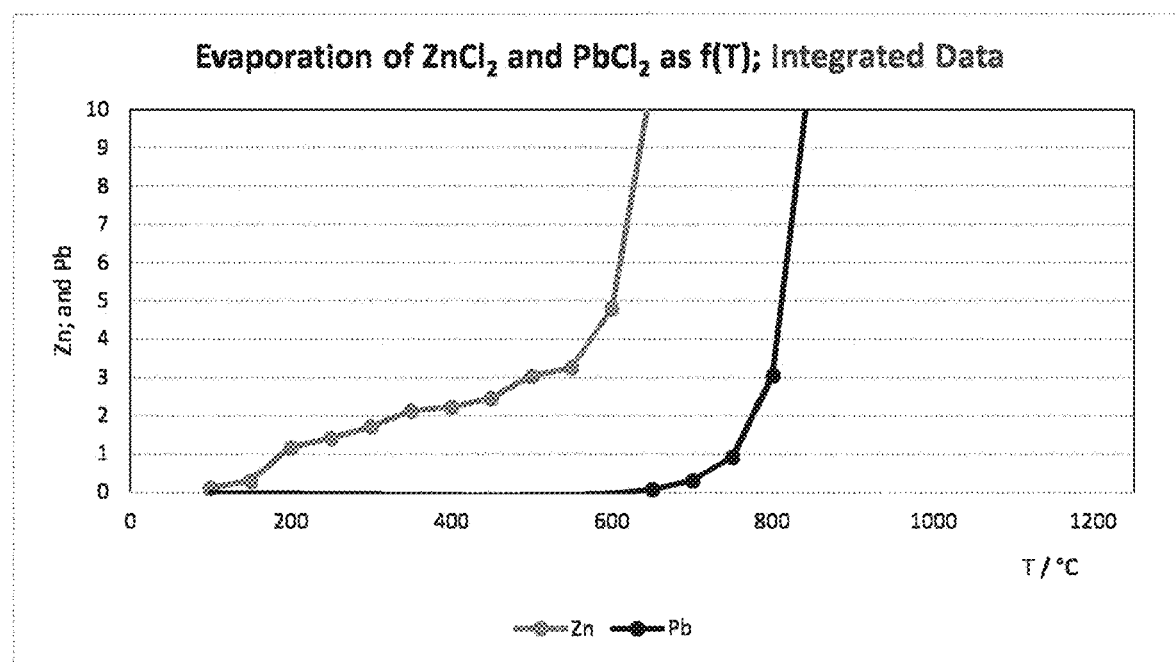
FIG. 5b is an enlargement of the portion of FIG. 5a showing the temperature range up to 800° C.

For example, blast furnace (BF) dust of sludge can be treated with chloride at 1100° C. resulting in a solid residue with concentration of Zn~100 ppm and Pb~20 ppm (see Example 3); residual chloride may be removed by a subsequent washing step.

c) Recovery of essentially pure $ZnCl_2$ (>99% Zn) at temperatures around 650° C.:

Up to 650° C. the concentration of Pb in the evaporated product is quite low resulting in a high Zn/Pb ratio (see Example 4 with FIG. 4, FIG. 5a and FIG. 5b). After collection of the ZnCl2 at 650° C., the concentrations of Zn and Pb in the solid residue may be minimized in a second step at higher temperatures. This opens the door for obtaining a ZnCl2 concentrate with a low concentration of Pb by a thermal process and avoiding a wet treatment for separating Pb from Zn. Optionally a wet treatment can minimize the Pb concentration even further by precipitation of PbSO4.

The solid residue can be recycled back into the steel manufacturing process. For example, electric arc furnace (EAF) dust can be mixed with FeCl2 or HCl with a subsequent thermal treatment at 650° C. The concentration of Pb in the evaporated material is <1% (as calculated from the data of FIG. 5).

d) Elimination of Cl from materials comprising Cl, e.g. pickling solution:

FeCl2 solution from steel pickling can be utilized by mixing with materials comprising Zn or Pb, e.g. BF dust or sludge or EAF dust. Thermal treatment evaporates ZnCl2 and PbCl2, and the solid residue can be recycled back into the steel manufacturing processes.

Preferred embodiments and advantages of the invention include the following:

Non-oxidizing atmosphere during the thermal treatment

No reducing gas atmosphere necessary: Elimination of Zn without reducing Fe oxides Generation of pure ZnCl2 with specifically evaporating ZnCl2 by performing the thermal treatment at temperatures of 500-700° C., preferably 600-680° C., in a non-oxidizing atmosphere. (0.5-2.5 h, preferably 1-2 h, treatment time at the target temperature).

Slight excess of Cl (or no excess of Cl, or even <100% of stoichiometry): Molar ratio ([Zn]+[Pb])/[Cl]<2, preferably <1.3

Depending on the reactivity of the material comprising Zn and/or Pb the chloride source may be selected: FeCl2 offers the advantage that the chloride is not very fugitive, whereas HCl may offer a better reactivity; and by-pass dust may result in a solid material (mineral compound) with better compatibility for application in cement industry Significant reduction of the amount of Zn and/or Pb and at the same time generation of a Cl-free material after thermal treatment Generation of a material free of Zn and Pb (Zn<200 ppm; Pb<50 ppm) by performing the thermal treatment in a non-oxidizing atmosphere at a temperature of 1000-1100° C.

Specific process:

Process for elimination of Zn and Pb from BF dust (blast furnace dust) by:

a. passing BF dust into a solution comprising chloride, e.g. HCl or FeCl2 solution, b. removing excess water by filtration (resulting in modified BF sludge), c. optionally drying and/or pelletizing, d. and subjecting the material obtained to a thermal treatment It appears that not all of the Zn or Pb is available in the form of ZnCl2 or PbCl2 at the beginning of the thermal treatment. Even after longer treatment at 800° C. (i.e. above the boiling point of ZnCl2) some Zn remains in the solid bed. For complete conversion of Zn into ZnCl2 apparently a temperature of T~1000-1100° C. is required.

Another embodiment of the invention encompasses preparing a mixture with a (slightly) understoichiometric amount of Cl. Such a preparation enables the evaporation of most of the Zn present as ZnCl2, and at the same time a solid bed material is obtained without chloride contamination.

A preferred embodiment of the invention makes use of materials that comprise chlorine in the form of chloride ions, especially chloride ions in the presence of water. It appears that the reactivity of chloride ions in the presence of water with heavy metal oxides (especially ZnO or PbO or more complex materials of the form $Me_xZnO_y$, with Me being a metal other than Zn) is significantly improved compared to HCl gas or crystalline chlorides like $CaCl_2$. In cases of blends of dry materials the yield of heavy metal chlorides during thermal treatment can be improved by adding a small amount of water prior to thermal treatment.

The existence of chloride ions in the presence of water in an intermediate step (or for a certain time) can improve the yield of heavy metal chlorides during thermal treatment even after drying the reaction mixture prior to thermal treatment.

Separating zinc chloride from the gas phase may be difficult as the ZnCl2 particles are very fine. Even bubbling through water leaves a fraction of the ZnCl2 particles unseparated in the gas phase. Therefore, one embodiment of the invention encompasses separating the ZnCl2 from the gas phase at a temperature above the melting point of zinc chloride and thus obtaining zinc chloride as a liquid.

The obtained ZnCl2 may be used for electrolytic conversion into metallic Zn, for manufacture of ZnS pigments, as electrolyte for batteries for manufacture of ZnO or as a micronutrient fertilizer.

For electrolytic conversion into metallic Zn or use as a micronutrient fertilizer, conversion into ZnSO4 by reaction with sulfuric acid may be advantageous.

A wet treatment of ZnCl2 also allows a reduction of Pb contamination by precipitation and separation of PbSO4. Thus a Zn/Pb ratio of >10000 may be achieved.

Definitions

Waste materials or industrial by-products comprising chlorine: FeCl2 solution from steel pickling or from TiO2 production, HCl obtained as a by-product or HCl comprising metal ions, by-pass dust from cement industry, PVC (especially with inorganic fillers), any composition comprising any of the materials mentioned Any HCl obtained in combination with any other product is an industrial by-product according to the definition above, i.e. any HCl that is not obtained by reaction of H2 and Cl2 is an industrial by-product or waste material in the sense of claim 1.

Materials comprising heavy metals (HM): Blast furnace dust (BF dust) or sludge comprising Zn and/or Pb, electric arc furnace dust (EAF dust) comprising Zn and/or Pb, active carbon used for absorption comprising heavy metals, especially Zn and/or Pb, sludges obtained from neutralization of heavy metals, e.g. from waste water treatment, any composition comprising any of the materials mentioned.

Non-oxidizing atmosphere: Atmosphere with an oxygen content of <5% by mass; the atmosphere may consist of nitrogen, noble gases, CO2, CO, H2 or mixtures of any of these.

Oxidizing atmosphere: Atmosphere comprising >5% of oxygen, e.g. air.

EXAMPLES

Example 1

There was mixed BF sludge ("Gichtgasschlamm") obtained from separation of dust from blast furnace with by-pass dust from cement manufacturing (BPD) on a dry weight ratio of 35% steelworks dust and 65% bypass dust. Prior to thermal treatment in a muffle furnace the mixture was dried at 105° C. for 5 h.

The chloride content of the bypass dust was 6.4%, the content of Zn and Pb in the steelworks dust was 2.3 and 0.5%, respectively.

The composition (C) obtained was thermally treated in a crucible in a muffle furnace at 900° C. for 90 min.

After thermal treatment there were found many needle like crystals in the upper part of the crucible. In contrast to this, the individual materials, i.e. steelworks dust and bypass dust from cement manufacturing did not exhibit any crystal formation in the crucible with the same thermal treatment.

Loss of weight of composition (C) due to thermal treatment at 900° C. was 16.66%, whereas the calculated loss of weight from individual components (both also dried at 105° C. for 5 h prior to thermal treatment in a muffle furnace) was 10.79% (24.10% for BF sludge and 3.62% for BPD).

There is a "synergy effect" for loss of weight of the mixture of 5.87% indicating that evaporation is promoted if chloride and heavy metals are brought into contact.

Example 2

A series of experiments were performed with a muffle furnace to study the effects of process temperature and oxidizing/non-oxidizing conditions on the efficiency of heavy metal removal from the waste products. To this end, mixtures of BF sludge+HCl, BF sludge+FeCl$_2$, BF sludge+ by-pass dust (BPD) from cement manufacturing, and electric-arc furnace dust (EAFD)+BPD were prepared in glass beakers using molar ratios of Cl/(Zn+Pb) of 1:1, 5:1, and 10:1 (Table 1). Certain amounts (4-17 g) of the mixtures were then weighed in 50 mL corundum crucibles (accuracy of ±1 mg) for the experiments.

The effect of oxidizing/non-oxidizing conditions on heavy metal removal were investigated by either flushing the muffle furnace with air (oxidizing conditions) or argon (non-oxidizing conditions) at a flux rate of ~320 L/h. After insertion of the samples, the muffle furnace was heated to 1000° C. and continuously flushed with either air or argon. In the latter case, the muffle furnace was flushed with argon for 60 min at room temperature (i.e., before heating) to establish non-oxidizing conditions prior to temperature increase. After thermal treatment at 1000° C. for a retention time of 180 minutes, the crucibles with the run products resided in the muffle furnace under continuous gas flow and were cooled there to ~300° C. Further cooling of the samples to room temperature then took place after removal from the furnace in the ambient atmosphere.

The effect of process temperature on the efficiency of heavy metal removal was investigated in an experiment that involved removal of specific samples from the muffle furnace at specific temperatures. In this experiment, eight samples of a mixture of BF sludge+HCl with a molar ratio of Cl/(Zn+Pb) of 1 were simultaneously heated from room temperature to an end temperature of 1200° C. Starting from 500° C. and in steps of 100° C., sample after sample were consecutively removed from the furnace and quenched in air to fix the bulk composition of the material at a given temperature step. As it turned out to be impractical to perform a similar experiment with an argon atmosphere, an equivalent time/temperature series was done using thermo-gravimetric analysis (TGA) as shown in Example 4.

The crucibles of each experimental run were weighed and the run product ground using pestle and mortar. The element mass fractions of the ground products, as well as of the ground educts from each experiment were determined by inductively coupled plasma optical emission spectrometry (ICP-OES) after microwave-assisted total digestion (HNO$_3$/HClO$_4$/HF).

TABLE 1

Mass fractions of Zn and Pb of various materials mixtures thermally treated at 1000° C. under non-oxidizing and oxidizing conditions.

| Zn/Pb source | Cl source | Molar ratio Cl/(Zn + Pb) | Gas | T ° C. | t min | Educts Zn mg/kg | Pb | Products Zn | Pb | Removal efficiency Zn % | Pb |
|---|---|---|---|---|---|---|---|---|---|---|---|
| BFS | HCl | 5:1 | Ar | 1000 | 180 | 24545 | 6793 | 176 | 38 | 99.3 | 99.4 |
| BFS | HCl | 10:1 | Ar | 1000 | 180 | 22013 | 6020 | 88 | 42 | 99.6 | 99.3 |
| BFS | FeCl$_2$ | 5:1 | Ar | 1000 | 180 | 17848 | 4917 | 196 | 66 | 98.9 | 98.7 |
| BFS | FeCl$_2$ | 10:1 | Ar | 1000 | 180 | 13517 | 3731 | 55 | 83 | 99.6 | 97.7 |
| BFS | BPD | 5:1 | Ar | 1000 | 180 | 8854 | 3398 | 327 | 197 | 96.3 | 94.2 |
| EAFD | BPD | 5:1 | Ar | 1000 | 180 | 18538 | 2123 | 11072 | 714 | 40.3 | 66.4 |
| BFS | HCl | 1.33:1 | Air | 1000 | 30 | 23636 | 6911 | 37104 | 1975 | -57.0† | 71.4 |

BFS: BF sludge;
EAFD: electric-arc furnace dust;
BDP: by-pass dust from cement manufacturing.
T: process temperature;
t: retention time.
†The relative increase in Zn is due to combustion (i.e., removal) of carbon during thermal treatment.

FIG. 1 shows the Zn and Pb concentrations of the various materials mixtures thermally treated at 1000° C. for 180 min under non-oxidizing conditions (products) compared against Zn and Pb concentrations of the starting materials (educts); cf. Table 1 for experimental conditions.

Figure 2:
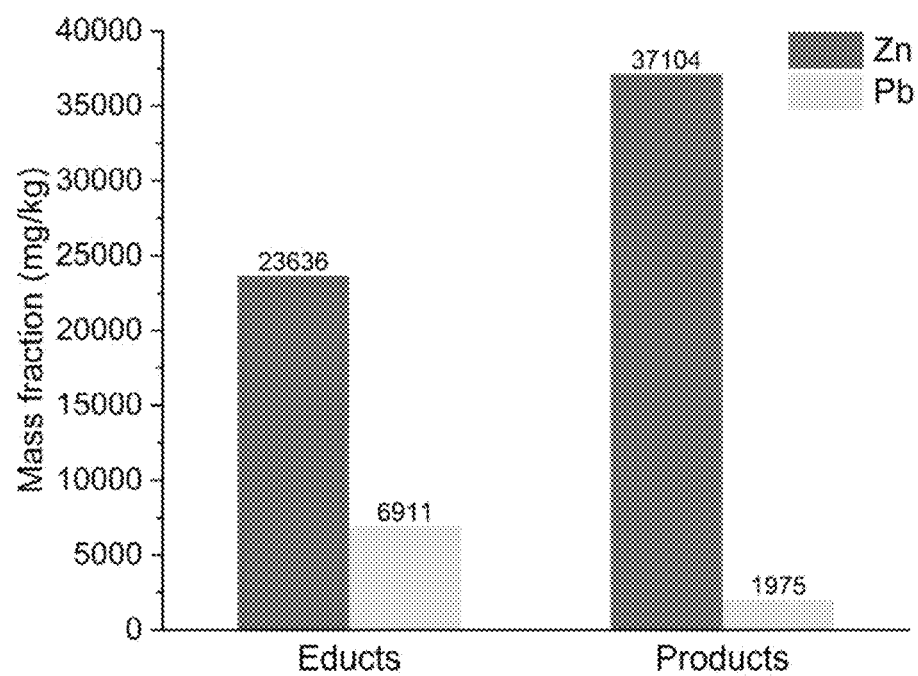
FIG. 2 shows the Zn and Pb concentrations in BF sludge prior (Educts) and after (Products) thermal treatment in air at 1000° C. as observed in Example 2.

FIG. 2 compares the Zn and Pb concentrations of a mixture of BF sludge+HCl with a molar ratio of Cl/(Zn+Pb) of 1 thermally treated at 1000° C. under oxidizing conditions, i.e., in air, (products) against Zn and Pb concentrations of the starting material (educts). Note that the increase in Zn in the product compared to the educt is due to combustion (i.e., removal) of carbon during thermal treatment, causing a relative enrichment.

Figure 3:
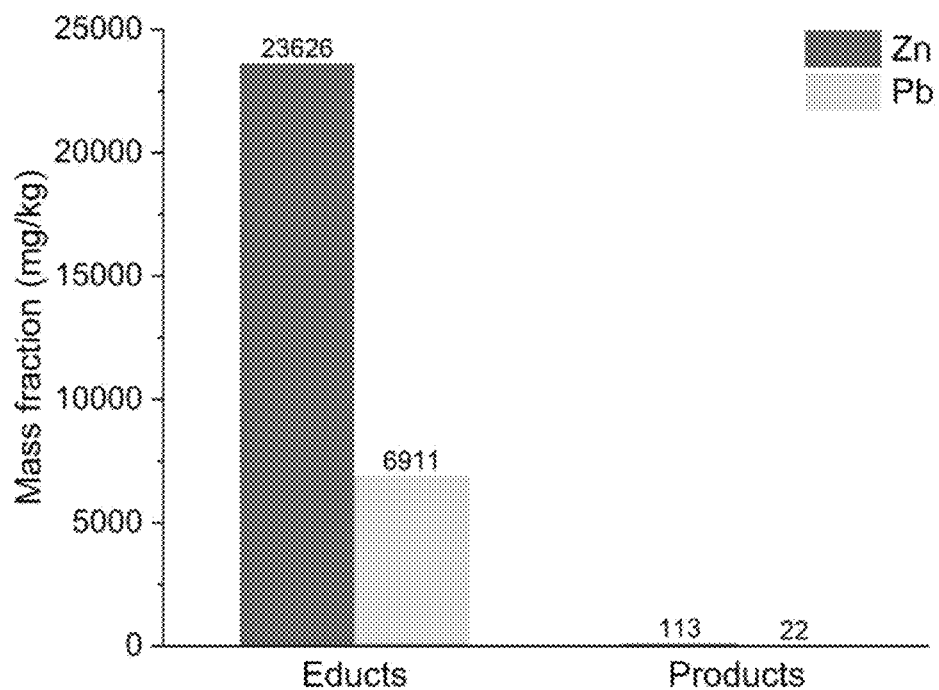
FIG. 3 shows the Zn and Pb concentrations in BF sludge prior (Educts) and after (Products) thermal treatment in N2 atmosphere at 1100° C. as observed in Example 3.

As is visualized by FIGS. 1, 2 and 3, the influence of the gas atmosphere is strikingly evident!

In an oxidizing atmosphere (air) no significant evaporation of $ZnCl_2$ was detected, regardless of the process temperature (FIG. 2; Table 1), whereas in a non-oxidizing atmosphere (argon) significant evaporation of $ZnCl_2$ and $PbCl_2$ was detected (FIG. 1; Table 1).

Maybe there are catalytic effects that initiate decomposition of $ZnCl_2$ into ZnO, because pure $ZnCl_2$ is stable and should evaporate at these temperatures.

Example 3

There was mixed 415.7 g of a filter cake of blast furnace sludge (BF sludge, "Gichtgasschlamm") with 42.1 g of hydrochloric acid (with 37% of HCl). For better mixing behavior there was added 60 mL of water.

The mixture was dried for 3 h at 105° C., and the preparation obtained (Educt) was thermally treated in a rotating quartz kiln. Heating to 1100° C. was done in 168 min, and heating at 1100° C. was done for 34 min.

A non-oxidizing atmosphere was maintained during thermal treatment by passing $N_2$ through the quartz kiln at a rate of 400 L/h. The $N_2$ atmosphere was maintained during cooling to room temperature (~3 h).

The Zn and Pb concentrations prior and after the thermal treatment are shown in FIG. 3: As can be seen, more than 99% of Zn and Pb are eliminated by the thermal treatment.

Example 4: Thermogravimetry

Thermogravimetric (TG) investigations with analysis of the gas phase were carried out using a Netzsch STA 443 F3 Jupiter thermal analyzer equipped with a silicon carbide furnace. 30-40 mg of the mixture of BF sludge and HCl ("Educt" from Example 3) were filled in a TG sample holder and placed in the thermal analyzer which was either flushed with synthetic air for oxidizing conditions or with argon for non-oxidizing conditions. The sample mixture inside the TG sample holder was heated in the silicon carbide furnace to a maximum temperature of 1200° C. using a rate of 5K/min. The weight of the sample was permanently determined against an inert material (corundum) over time and the off-gas of the system was led continuously through a heated transfer line (heated to 160° C.) into washing flasks (10 mL nitric acid 10%) that were changed every 10 min (i.e., in 50° C. temperature intervals) to investigate removal of zinc and lead as a function of temperature. The concentrations of Pb and Zn were determined by ICP-OES (inductively coupled plasma optical emission spectrometry) using a similar analytical routine as for Example 2. The concentrations of the solutions that correspond to a certain temperature are presented in FIGS. 4 and 5.

FIG. 4 shows the Zn and Pb concentrations in the nitric acid solution, indicating the amount of Zn and Pb evaporated as a function of temperature. The (relative) concentration of Zn and Pb indicates the (relative) intensity of evaporation of Zn and Pb at the given temperature.

FIG. 5a shows the integrated Zn and Pb concentrations in nitric acid solution collected during thermal treatment. Integrated data means summing up all incremental fractions up to the indicated temperature.

FIG. 5b is an enlargement of the portion of FIG. 5a showing the temperature range up to 800° C.

As can be seen from the data depicted in FIGS. 5a and 5b, at temperatures<650° C. the fraction of $PbCl_2$ in the evaporated material is quite low, i.e., the evaporated material consists of nearly pure $ZnCl_2$.

Example 5

BF dust can be collected in HCl or $FeCl_2$ solution until the total amount of Zn+Pb is nearly equivalent to two times the total amount of Cl (on a molar base).

After filtration or centrifugation (and optionally drying), thermal treatment at a temperature of 1000-1100° C. in non-oxidizing atmosphere is sufficient for evaporating more than 99% of Zn and Pb.

The solid material obtained after the thermal treatment (with ~30% FeO, ~40% C, ~10% $SiO_2$, and some CaO, $Al_2O_3$ and MgO) can be recycled into the steel making process or can be used as iron source and fuel for production of cement.

The invention claimed is:

1. A process for the purification of waste materials or industrial by-products comprising chlorine (B), the process comprising the steps of:
   a) preparing a composition (C) by blending or mixing waste materials or industrial by-products comprising chlorine (B) with one or more materials comprising heavy metals (HM);
   b) reacting (B) and (HM) by thermal treatment of (C);
   c) separating evaporated heavy metal chloride compounds (HMCC); and
   d) obtaining a solid material after the thermal treatment step, wherein:
      the heavy metals (HM) are one or more from the following set of elements: Zn, Pb, Hg, Cu, Cd, Tl, In, Sn, Ni, Co;
      the thermal treatment is carried out at a temperature of 500-1200° C. and under a non-oxidizing atmosphere;
      the materials comprising heavy metals (HM) and the waste materials or industrial by-products comprising chlorine (B) are mixed or blended in the presence of water, with 2-50% by mass of water being present in the composition (C); and:
   a) a ratio of the materials comprising heavy metals (HM) to the waste materials or industrial by-products comprising chlorine (B) is chosen so that a chlorine content of the composition (C) is between 100 and 150% of an amount necessary for a stoichiometric conversion of the heavy metals (HM) in the materials comprising heavy metals (HM) into chlorides; or
   b) the ratio of the materials comprising heavy metals (HM) to the waste materials or industrial by-products comprising chlorine (B) is chosen so that the chlorine content of the composition (C) is between 80 and 100% of the amount necessary for a stoichiometric conversion of the zinc in the materials comprising heavy metals (HM) into chlorides.

2. A process according to claim 1, wherein the waste materials or industrial by-products comprising chlorine (B) comprise a dust from cement manufacturing wherein the dust comprises 1-30% by mass of chloride.

3. A process according to claim 1, wherein the materials comprising heavy metals (HM) comprise >0.1% by mass of Zn and/or Pb.

4. A process according to claim 1, wherein the material comprising heavy metals (HM) comprises dust from steel production, dust obtained from electrosteel manufacturing or used activated carbon.

5. A process according to claim 1, wherein the waste materials or industrial by-products comprising chlorine (B) comprise waste metal chlorides obtained from a manufacture of $TiO_2$ according to a chloride process, waste metal chlorides obtained from a manufacture of synthetic rutile from ilmenite, waste iron chlorides obtained from steel pickling, or waste hydrochloric acid.

6. A process according to claim 1, wherein the thermal treatment is carried out at a temperature of 500-900° C.

7. A process according to claim 1, wherein the thermal treatment is performed at a temperature of 1000-1200° C.

8. A process according to claim 1, wherein the waste materials or industrial by-products comprising chlorine (B) further comprise zinc, the process comprising the steps of:
   a. supplying a solution comprising chloride;
   b. separating and collecting any fraction of blast furnace dust by passing the blast furnace dust through the solution comprising chloride;
   c. separating the solid material from liquid phase;
   d. drying the solid material and subjecting the solid material to thermal treatment sufficient for evaporation of $ZnCl_2$; and
   e. collecting the solid material obtained from thermal treatment.

9. A process according to claim 1, further comprising separating zinc chloride from a gas phase at a temperature above the melting point of zinc chloride and obtaining zinc chloride as a liquid.

10. A process according to claim 1, further comprising using the $ZnCl_2$ for electrolytic conversion into metallic Zn, manufacturing of ZnS pigments, manufacturing of ZnO, or manufacturing micronutrient fertilizers.

11. The process according to claim 1, wherein the materials comprising heavy metals (HM) and the waste materials or industrial by-products comprising chlorine (B) are mixed or blended in the presence of water, with 5-30% by mass of water being present in the composition (C).

12. A process according to claim 3, wherein the materials comprising heavy metals (HM) comprise >0.5% by mass of Zn and/or Pb.

13. A process according to claim 3, wherein the materials comprising heavy metals (HM) comprise >2% by mass of Zn and/or Pb.

14. A process according to claim 3, wherein the materials comprising heavy metals (HM) comprise >20% by mass of Zn and/or Pb.

15. A process according to claim 4, wherein the dust from steel production comprises a sludge or a filter cake obtained by separating dust from steel production.

16. A process according to claim 6, wherein the thermal treatment is carried out at a temperature of 500-850° C.

17. A process according to claim 6, wherein the thermal treatment is carried out at a temperature of 600-700° C.

18. A process according to claim 8, wherein supplying a solution comprising chloride comprises supplying a solution comprising HCl or $FeCl_2$.

* * * * *